United States Patent
Freund

(10) Patent No.: US 6,912,084 B2
(45) Date of Patent: Jun. 28, 2005

(54) METHOD AND APPARATUS FOR CONTROLLING PUMP POWERS OF BROADBAND RAMAN AMPLIFIERS USED IN OPTICAL TRANSMISSION SYSTEMS

(75) Inventor: Roland Wilhelm Freund, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 409 days.

(21) Appl. No.: 10/223,789

(22) Filed: Aug. 20, 2002

(65) Prior Publication Data

US 2004/0036954 A1 Feb. 26, 2004

(51) Int. Cl.[7] .............................. H01S 3/00; H04B 10/12
(52) U.S. Cl. ..................................... 359/334; 359/337.1
(58) Field of Search ............................... 359/334, 337.1

(56) References Cited

U.S. PATENT DOCUMENTS

| | | | |
|---|---|---|---|
| 6,611,370 B2 * | 8/2003 | Namiki et al. | 359/334 |
| 6,674,568 B2 * | 1/2004 | Liu | 359/334 |
| 6,697,187 B2 * | 2/2004 | Seydnejad et al. | 359/334 |

OTHER PUBLICATIONS

U.S. Appl. No. 10/095,021, filed Mar. 11, 2002, X. Liu.
Y. Emori et al., "Broadband Raman Amplifer for WDM", IEICE Trans. Electron., vol. E84–C. No. 5, pp. 593–597, 2001.
A. Hasegawa, "Numerical Study of Optical Soliton Transmission Amplified Periodically by the Stimulated Raman Process", Appl. Opt., vol. 23, No. 19, pp. 3302–3309, 1984.
H. Kidorf et al., "Pump Interactions In a 100–nm Bandwidth Raman Amplifier", IEEE Phton. Technol. Lett., vol. 11, No. 5, pp. 530–532, 1999.

X. Liu, "A Fast Control Algorithm For Achieving Flat Broadband Raman Gain With Multiple Pumps", Technical Memorandum No. 10009609–010115–48TM, Bell Laboratories, Lucent Technologies, USA, 2001.

L. Mollenauer et al., "Soliton Propagation In Long Fibers With Periodically Compensated Loss", IEEE J. Quantum Electron., vol. QE–22, No. 1, pp 157–173, 1986.

L. Mollenauer et al., "Demonstration of Soliton Transmission Over More than 4000 km in Fiber with Loss Periodically Compensated By Raman Gain", Opt. Letters, vol. 13, No. 8, pp. 675–677, 1988.

S. Namiki et al., "Ultrabroad–Band Raman Amplifiers Pumped and Gain–Equalized by Wavelength–DivisionMultiplexed High–Power Laser Diodes", IEEE J. Select. Topics Quantum Electron., vol. 7, No. 1, pp. 3–16, 2001.

(Continued)

Primary Examiner—Bernarr E. Gregory
Assistant Examiner—Eric Bolda
(74) Attorney, Agent, or Firm—Kenneth M. Brown

(57) ABSTRACT

A method and apparatus for controlling the pump powers of a broadband DWDM optical system using Raman amplification which determines pump settings that advantageously minimize the peak-to-peak ripple of the channel powers with respect to a given per-channel target. The illustrative method and apparatus first formulates a linear programming optimization problem, and then solves the formulated linear program in order to derive a new set of pump powers to be applied to the Raman amplification pumps. Illustratively, the linear program may be solved with use of any conventional linear programming solution technique, such as, for example, the simplex method.

20 Claims, 4 Drawing Sheets

OTHER PUBLICATIONS

V. E. Perlin et al., "On Distributed Raman Amplification for Ultrabroad–Band Long–Haul WDM Systems", J. Lightwave Technol., vol. 20, No. 3, pp. 409–416, 2002.

V.E. Perlin et al., "Optimal Design of Flat–Gain Wide–Band Fiber Raman Amplifiers", J. Lightwave Technol., vol. 20, No. 2, pp. 250–254, 2002.

L. Vardapetyan et al., "Equations in FROG: a Simplified Approach to Modeling Propagation in Raman and Erbium–doped Fiber", Technical Memorandum, Bell Laboratories, Lucent Technologies, USA, 2002.

M. Yan et al., "Automatic Design Scheme for Optical–Fiber Raman Amplifiers Backward–Pumped With Multiple Laser Diode Pumps", IEEE Phton. Technol. Lett., vol. 13, No. 9, pp 948–950, 2001.

X. Zhou et al., "A Simplified Model and Optimal Design of a Multiwavelength Backward–Pumped Fiber Raman Amplifier", IEEE Photon. Technol. Lett., vol. 13, No. 9, pp. 945–947, 2001.

* cited by examiner

METHOD AND APPARATUS FOR CONTROLLING PUMP POWERS OF BROADBAND RAMAN AMPLIFIERS USED IN OPTICAL TRANSMISSION SYSTEMS

FIELD OF THE INVENTION

The present invention relates generally to the field of optical transmission systems, and more particularly to a method and apparatus for controlling the pump powers of broadband Raman amplifiers which may be used to compensate for fiber loss in such systems.

BACKGROUND OF THE INVENTION

The demand for communication systems with higher capacities has pushed the common design approaches of WDM (wavelength-division-multiplexed) optical systems to their limits. (WDM optical systems are fully familiar to those of ordinary skill in the art.) A typical configuration of a point-to-point WDM system includes a number of optical transmitters, optical multiplexers, spans of transmission fiber, optical amplifiers (traditionally, erbium-doped fiber amplifiers, or EDFAs), dispersion compensating devices, optical demultiplexers, and a number of optical receivers. Unfortunately, the usable gain bandwidth for the optical amplifiers typically used in current systems, such as, for example, EDFAs, is limited and not very broad, and the distortion of the signal does not allow for transmission over very long optical transmission links. This has led to the investigation of alternate methods for amplification with greater broadband capabilities that allow for longer spacing in between amplification and longer transmission distances. Optical systems with such broadband capabilities are commonly referred to as DWDM (dense wavelength-division-multiplexed) systems.

It has long been known that stimulated Raman scattering, which is a well-known physical phenomenon, can be employed to build amplifiers to compensate for fiber loss in optical transmission systems. In particular, Raman amplification, which is fully familiar to those of ordinary skill in the art, advantageously uses the fiber itself as the amplification medium. Specifically, high-power (Raman) pump waves are launched into a silica fiber at a wavelength lower than that of the signal(s) to be amplified. Amplification then occurs when the pump wavelength gives up its energy to create new photons at the signal wavelength(s).

In recent years, there has been increased interest in the possible practical uses of Raman amplification techniques. There are at least two primary reasons for this renewed interest. First, the Raman effect has a very broad gain curve, which makes it very attractive for today's broadband DWDM systems, fully familiar to those of ordinary skill in the art. And second, Raman amplification typically requires pumps with outputs of several hundreds of milliwatts. Semiconductor pump lasers with such power outputs have only recently become available, and thus Raman amplification has now become practical.

FIG. 1, for example, shows a typical Raman gain curve, normalized so that the maximal gain is one, for a Raman pump operating at 205 THz (TeraHertz). Also shown is an illustrative set of channel frequencies in a typical state-of-the-art DWDM system. Illustratively, there are 128 channels, from 186.50 THz to 192.85 THz, with 50 GHz (GigaHertz) spacing between them. As can be seen from the figure, even a single Raman pump provides gain for a large part of the signal band.

Moreover, even broader Raman gain bandwidth can then be achieved by combining the Raman amplification effect of multiple pump waves selected carefully for the wavelength domain. FIG. 2, for example, shows an illustrative set of 6 Raman gain curves, each operating at a different frequency, which together provide gain throughout the entire desired signal band. Thus, by employing a small number (e.g., 6) of Raman pumps, each operating at a different frequency, it is possible to provide sufficient gain throughout the entire desired signal band.

As indicated above, Raman amplifiers for broadband systems typically employ multiple pumps. However, despite the advantages of Raman-pumped DWDM systems, there are some degradation effects which occur. For example, in addition to the desired pump-to-signal power transfer, there also exist pump-to-pump and signal-to-signal power transfers. These unwanted power transfers introduce gain tilting in such a way that signals at longer wavelengths may experience stronger gain than those at shorter wavelengths. This effect leads to non-uniform gain and thus the non-uniform linear penalty and noise level across the signal wavelengths. Additionally, power fluctuations over time within the Raman pump wave, which often occurs, may lead to amplified fluctuations or jitter, which also degrades system performance.

For at least these reasons, it has been recognized that it would be advantageous to adjust the powers of the pumps in Raman-pumped DWDM systems dynamically, so that signal powers are as flat as possible, relative to some given power target. One such recently developed technique for performing Raman pump power control to achieve such gain flattening is disclosed in co-pending U.S. patent application Ser. No. 10/095021, filed on Mar. 11, 2002 by X. Liu (hereinafter "Liu"), and commonly assigned to the assignee of the present invention. The technique of Liu uses a simple feedback mechanism based on the measured signal powers in order to adjust the pumps. More particularly, the Liu approach adapts the Raman pump powers (and, in certain embodiments thereof, the pump wavelengths as well), based on a closed-form mathematical formula which depends upon differences between a desired gain profile and a determined gain profile. U.S. patent application Ser. No. 10/095021 is hereby incorporated by reference as if fully set forth herein.

Note, however, that the technique as disclosed in Liu has certain limitations. First, it typically requires a number of feedback iterations for the pump settings to converge. Second, it can be determined that the effect of the Liu procedure is to approximately minimize the deviation of the signal powers from the target in a least-squares sense (i.e., to minimize the sum of the squares of the differences between the actual signal power at a given frequency and the target signal power at that frequency), even though it would be more advantageous to minimize the peak-to-peak ripple of the signal powers (i.e., to minimize the difference between the maximum difference between the actual signal power a given frequency and the target signal power at that frequency, and the minimum difference between the actual signal power at a given frequency and the target signal power at that frequency). In fact, it can be shown that the use of a least-squares minimization achieves a less desirable result than the use of a peak-to-peak ripple minimization, which difference may be potentially significant, especially as the number of signal channels increases. And third, when the number of channels exceeds the number of pumps (as is typical), there are channel configurations with arbitrary large ripple that lie in a certain null space of the least-squares formulation and thus cannot be corrected by the relatively simple feedback approach of Liu. Although it is possible to overcome the problem of slow convergence with a straightforward modification of the Liu technique, even after such a modification, the result nonetheless comprises a least-squares minimization approach.

Thus, it would be advantageous to provide a method for controlling the pump powers of a broadband DWDM optical system using Raman amplification which determines pump settings that are directed to minimizing the peak-to-peak ripple of the channel powers with respect to a given per-channel target.

SUMMARY OF THE INVENTION

An illustrative embodiment of the present invention provides a method and apparatus for controlling the pump powers of a broadband DWDM optical system using Raman amplification which determines pump settings that are advantageously directed to minimizing the peak-to-peak ripple of the channel powers with respect to a given per-channel target. More specifically, the illustrative method and apparatus first formulates a linear programming optimization problem, and then solves the formulated linear program in order to derive a new set of pump powers to be applied to the Raman amplification pumps. Illustratively, the linear program may be solved with use of any conventional linear programming solution technique, such as, for example, the simplex method (which is fully familiar to those of ordinary skill in the art).

DETAILED DESCRIPTION

An Illustrative Raman-Pumped DWDM System for Use by the Present Invention

Figure 1:
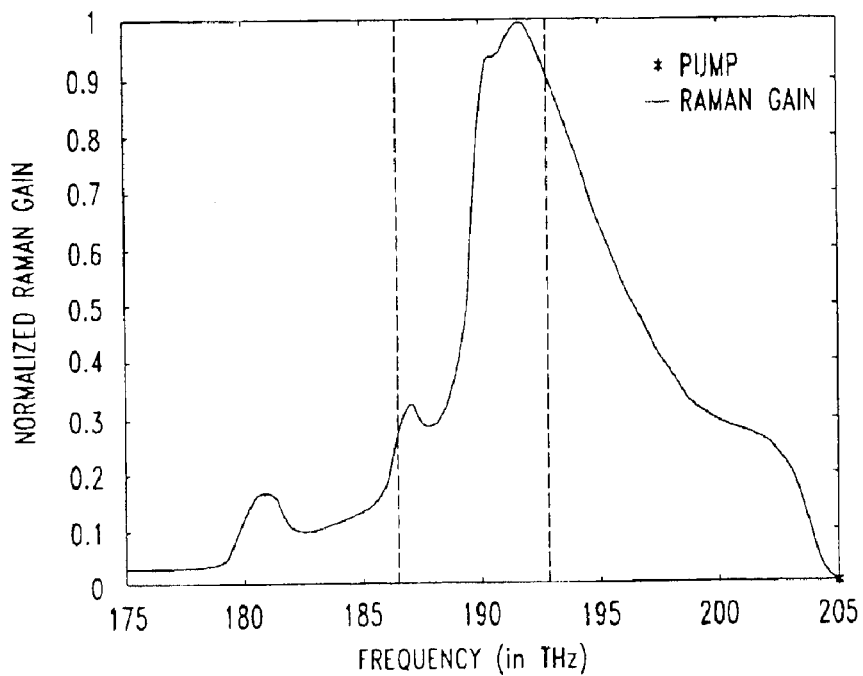
FIG. 1 shows a typical Raman gain curve, normalized so that the maximal gain is one, for an illustrative Raman pump operating at 205 THz.
Figure 2:
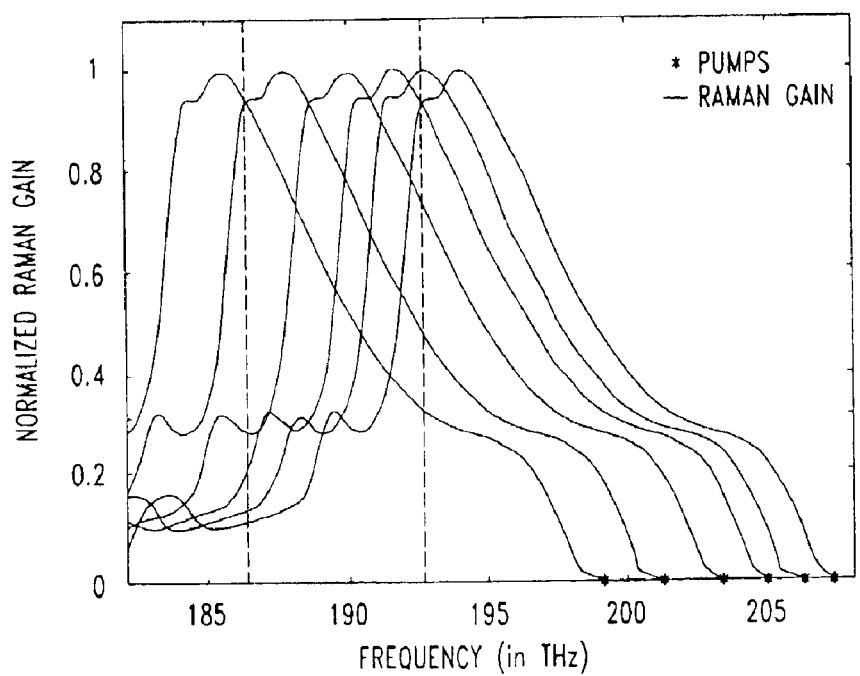
FIG. 2 shows an illustrative set of 6 Raman gain curves, each operating at a different frequency, which together provide gain throughout an entire desired signal band.
Figure 3:
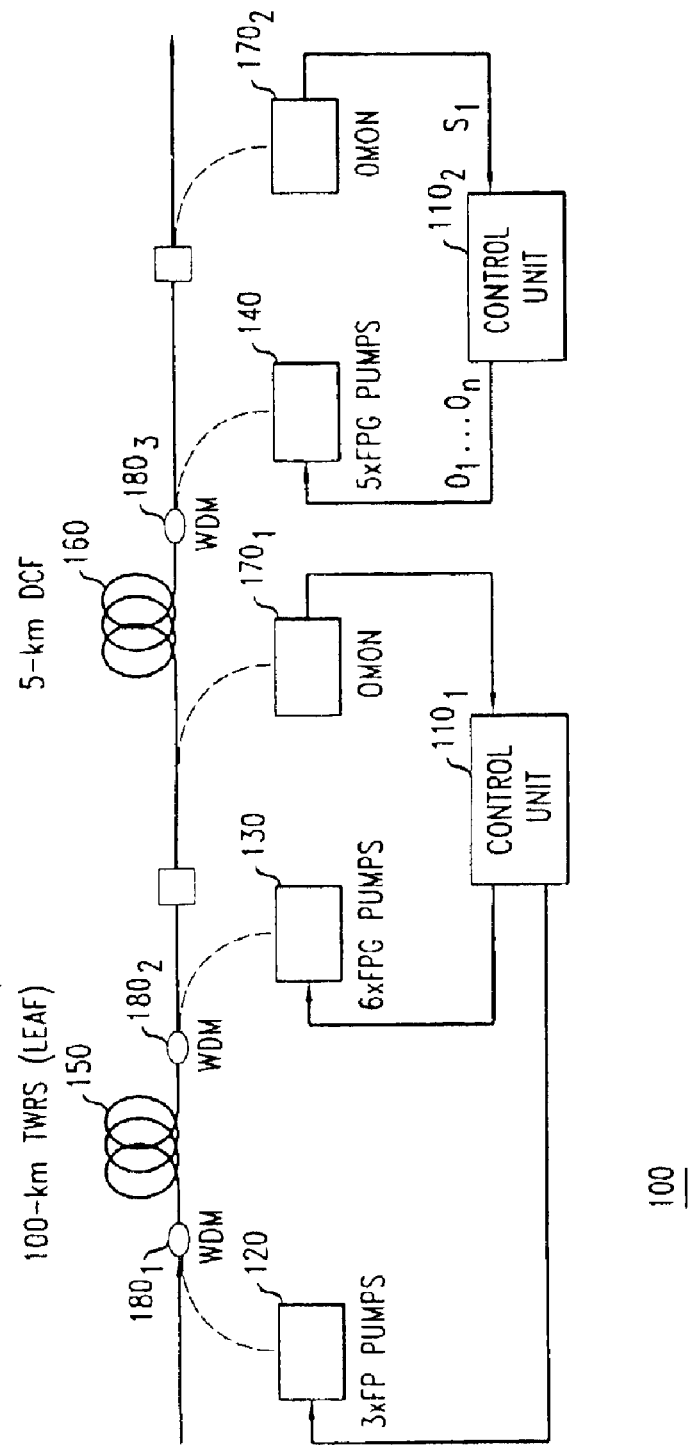
FIG. 3 shows a span of an illustrative Raman-pumped DWDM system in which an illustrative embodiment of the present invention may be advantageously employed.

FIG. 3 shows a span of an illustrative Raman-pumped dense wavelength-division-multiplexed (DWDM) system 100 in which an illustrative embodiment of the present invention may be advantageously employed. The DWDM system 100 of FIG. 3 illustratively provides amplification of optical signals in two sections, namely a 100-km true wave reduced slope (TWRS) fiber 150, and a dispersion-compensating fiber (DCF) 160. Power profiles of the amplified optical signals are advantageously measured by optical channel monitors (OMONs), subsequent to the two sections, and may be used to calculate parameters advantageously employed to achieve broadband Raman gain flattening. (True wave reduced slope fibers, dispersion-compensating fibers, and optical channel monitors are all conventional and fully familiar to those of ordinary skill in the art.)

Briefly stated, optical signals enter DWDM system 100. The signals are then amplified in the 100-km TWRS 150 and the power profile is subsequently measured by a first optical channel monitor (OMON) $170_1$. The optical signals then proceed to DCF 160 where they are again amplified and the power profile is again subsequently measured by second OMON $170_2$. The optical signals then proceed on through the DWDM system 100.

System 100 of FIG. 3 includes two control units $110_1$ and $110_2$, a set of forward Raman pumps 120 (illustratively three), a first set of backward Raman pumps 130 (illustratively six), a second set of backward Raman pumps 140 (illustratively five), a TWRS 150 (illustratively 100-km), a dispersion-compensating fiber (DCF) 160 (illustratively 5-km), two optical channel monitors (OMONs) $170_1$ and $170_2$, and three wavelength-division-multiplexers (WDMs) $180_1$, $180_2$, and $180_3$ for coupling the Raman pump waves into system 100.

As can be seen from FIG. 3, all entering optical signals pass through the 100-km TWRS 150, where they are amplified by the three forward Raman pumps 120 and the six backward Raman pumps 130. The Raman pump waves of the Raman pump sets 120 and 130 are coupled into the 100-km TWRS by WDMs $180_1$ and $180_2$. The six backward Raman pumps 130 are advantageously divided into two groups, each of three equally frequency-spaced pumps. The first set of backward Raman pumps 130 are implemented to advantageously reduce WDM loss in the span due to noise nonlinearity caused by power fluctuations in the pumps. After the optical signal is amplified, a first gain profile is determined by the first OMON $170_1$. The optical signals then proceed to the, illustratively, 5-km DCF 160. In the DCF 160, the second set of backward Raman pumps 140 amplify the optical signals again. The second set of backward Raman pumps 140 include a group in which three of the five pumps used are equally spaced in frequency. All of the five backward Raman pumps used in this second set 140 are used for pumping the dispersion-compensating fiber (DCF) 160. The Raman pump waves of the five backward Raman pumps 140 are coupled into the 100-km TWRS by the WDM $180_3$. After the optical signal is amplified, a second gain profile is determined by the second OMON $170_2$. The optical signals then continue through the span of the system 100.

In accordance with an illustrative embodiment of the present invention, the determinations provided by the OMONs $170_1$ and $170_2$ are advantageously transmitted back to control units $110_1$ and $110_2$, respectively. (In another illustrative embodiment of the present invention, the measurements from both of the OMONs $170_1$ and $170_2$ are sent to a single two-channel control unit). These determinations may, for example, include data reflecting signal powers, pump wavelengths, and other system parameters. The control units $110_1$ and $110_2$ advantageously process the information from the OMONs $170_1$ and $170_2$ and calculate the appropriate Raman pump powers for gain flattening across the system, in accordance with the principles of the present invention, and illustratively in accordance with the method described in detail below.

Briefly, control units $110_1$ and $110_2$ utilize power spectrum data provided by the OMONs $170_1$ and $170_2$ respectively, to responsively adjust the pump powers of all of the Raman pumps (illustratively, Raman pumps 120, 130, and 140) in a manner tending to produce a relatively flat gain profile (or other desired gain profile). The control function of the exemplary embodiment includes a negative feedback loop that automatically adjusts Raman pump powers based on signal power profile. In the DCF, the output signal profile is advantageously used as the input to the DCF and gain flattening is then performed according to the output signal profile from the DCF.

Figure 4:
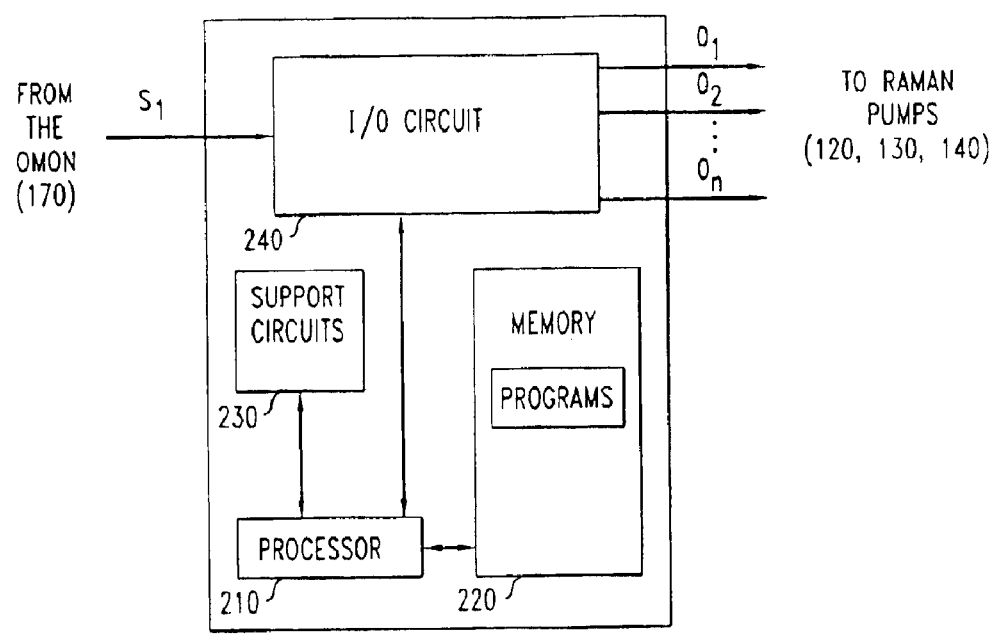
FIG. 4 shows a high-level block diagram of a control unit suitable for use in a system for controlling the pump powers of a Raman-pumped DWDM optical system in accordance with an illustrative embodiment of the present invention.

FIG. 4 shows a high-level block diagram of a control unit suitable for use in a system for controlling the pump powers of a Raman-pumped DWDM optical system in accordance with an illustrative embodiment of the present invention. More specifically, the control unit shown in FIG. 4 comprises an illustrative embodiment of a control unit suitable for use in the all-Raman-pumped DWDM system 100 of FIG. 3. The control unit 110 of FIG. 4 illustratively comprises processor 210, as well as memory 220 for storing software and/or firmware implementations of the present invention and other control programs. Processor 210 advantageously cooperates with conventional support circuitry 230 such as power supplies, clock circuits, cache memory and the like, as well as circuits that assist in executing the software/firmware routines stored in memory 220. Control unit 110 also advantageously contains input-output circuitry 240 that forms an interface between the various functional elements communicating with the control unit 110. For example, in the illustrative embodiment of the present invention as shown in FIG. 4, control unit 110 advantageously communicates with one of the OMON 170 devices via a signal path S1 and to each of a plurality of Raman pumps via signal paths $O_1$–$O_n$.

An Illustrative Model Used in Accordance with an Embodiment of the Invention

We now develop a formal (i.e., mathematical) model of the Raman pump power control "problem" (i.e., task) of the present invention, and describe an approach to "solving" the "problem" in accordance with an illustrative embodiment of the present invention.

Consider the propagation of n signal channels along a fiber of length L. We denote by $\omega_i^{(s)}$, i=1, 2, . . . , n, the frequencies of the signals. The signals are advantageously amplified by $m^{(b)}$ backward and $m^{(f)}$ forward Raman pumps. We denote by $\omega_j^{(b)}$, j=1, 2, . . . , $m^{(b)}$, the frequencies of the backward pumps, and by $\omega_k^{(f)}$, k=1, 2, . . . , $m^{(f)}$, the frequencies of the forward pumps. Note that $\omega_j^{(b)} > \omega_i^{(s)}$ and $\omega_j^{(f)} > \omega_i^{(s)}$ for all i,j and k.

It is well known that the propagation of the signal and pump waves along the fiber may be described by a coupled system of first-order differential equations. Specifically, the set of equations for the signal powers is as follows:

$$\frac{d}{dz}S_i(z) = -\alpha_i^{(s)}S_i(z) + \sum_{k=1}^{m^{(f)}} r_{ik}^{(f)} P_k^{(f)}(z)S_i(z) + \sum_{j=1}^{m^{(b)}} r_{ij}^{(b)} P_j^{(b)}(z)S_i(z) + \sum_{l=1}^{n} \text{sign}(\omega_l^{(s)} - \omega_i^{(s)}) r_{il}^{(s)} S_l(z)S_i(z), \quad (1)$$

$$0 \le z \le L, \, i = 1, 2, \ldots, n.$$

Here, $S_i(z)$, $P_k^{(f)}(z)$, and $P_j^{(b)}(z)$, denote the power (e.g., in mW) at position z of the i'th channel, the k'th forward pump, and the j'th backward pump, respectively. Moreover, $\alpha_i^{(s)}$ is the fiber loss at signal wavelength $\omega_i^{(s)}$, and $r_{ik}^{(f)}$, $r_{ij}^{(b)}$ and $r_{il}^{(s)}$ are the Raman gain between the i'th channel and the k'th forward pump, the j'th backward pump and the l'th channel, respectively.

Note that the fourth term of the right-hand side of Equation (1) represents signal channels pumping each other. Since the signal powers are typically one to two orders of magnitude smaller than the pump powers, the contributions in Equation (1) due to these channel-channel interactions are insignificant compared to the other terms. Therefore, in Equation (1), the last term may be advantageously dropped. Moreover, by dividing by $S_i(z)$ and using the fact that $$\frac{1}{S_i(z)}\frac{d}{dz}S_i(z) = \frac{d}{dz}\ln S_i(z),$$

the resulting system of differential equations is as follows:

$$\frac{d}{dz}\ln S_i(z) = -\alpha_i^{(s)} + \sum_{k=1}^{m^{(f)}} r_{ik}^{(f)} P_k^{(f)}(z) + \sum_{j=1}^{m^{(b)}} r_{ij}^{(b)} P_j^{(b)}(z), \quad (2)$$

$$0 \le z \le L, \, i = 1, 2, \ldots n.$$

By integrating Equation (2) over the length of the fiber—i.e., over the interval $0 \le z \le L$, we obtain the equations $$\ln S_i(L) = \ln S_i(0) - \alpha_i^{(s)} + \sum_{k=1}^{m^{(f)}} r_{ik}^{(f)} \int_0^L P_k^{(f)}(z)dz + \sum_{j=1}^{m^{(b)}} r_{ij}^{(b)} \int_0^L P_j^{(b)}(z)dz \quad (3)$$

for i=1, 2, . . . , n.

The Raman control problem is to adjust the initial values $$\rho_j := p_j^{(b)}(L), j=1, 2, \ldots, m, m:=m^{(b)}, \quad (4)$$

of the m backward pumps such that the signal powers $S_i(L)$, i=1,2, . . . , n, at the end of the fiber are as "flat" as possible (in a yet to be specified sense—see below). To this end, Equation (3) may be advantageously written in terms of $$y_i = 10 \log 10(S_i(L)) = \gamma \ln S_i(L), \text{ where } \gamma := 10 \log 10(\exp(1)), \quad (5)$$

which is just the i'th channel power in dBm. Moreover, set $$c_i := \gamma\left(\ln S_i(0) - \alpha_i^{(s)}L + \sum_{k=1}^{m^{(f)}} r_{ik}^{(f)} \int_0^L P_k^{(f)}(z)dz\right), \quad (6)$$

$$R_{ij} := \gamma r_{ij}^{(b)}, \overline{P_j} := \int_0^L P_j^{(b)}(z)dz.$$

Using Equations (5) and (6), Equations (3) can be advantageously rewritten as follows:

$$y_i = c_i + \sum_{j=1}^{m} R_{ij}\overline{P_j}, \, i = 1, 2, \ldots n. \quad (7)$$

Next, we introduce the vectors $$\rho := \begin{bmatrix} \rho_1 \\ \rho_2 \\ \vdots \\ \rho_m \end{bmatrix}, \overline{P} := \overline{P}(\rho) = \begin{bmatrix} \overline{P_1} \\ \overline{P_2} \\ \vdots \\ \overline{P_m} \end{bmatrix}, y := y(\rho) = \begin{bmatrix} y_1 \\ y_2 \\ \vdots \\ y_n \end{bmatrix}, c := \begin{bmatrix} c_1 \\ c_2 \\ \vdots \\ c_n \end{bmatrix}, \quad (8)$$

and the n×m matrix $$R = \begin{bmatrix} R_{11} & R_{12} & \cdots & R_{1m} \\ R_{21} & R_{22} & \cdots & R_{2m} \\ \vdots & \vdots & & \vdots \\ R_{n1} & R_{n2} & \cdots & R_{nm} \end{bmatrix}. \quad (9)$$

With Equations (8) and (9), the system of Equation (7) can be advantageously stated in the following compact form:

$$y(\rho) = c + R\bar{P}(\rho). \quad (10)$$

Recall that the control variables are the initial values of the backward pumps as shown in Equation (4), which, by Equation (8), are just the entries of the vector $\rho$ in Equation (10). Moreover, in Equation (10), R is the Raman gain matrix for which nominal values are known, and $y(\rho)$ is the vector of channel powers (e.g., in dBm) at the end of the fiber. In accordance with an illustrative embodiment of the present invention, values for $y(\rho)$, up to some noise level, may be advantageously measured by the system's optical monitor (OMON). (Optical monitors are conventional and fully familiar to those of ordinary skill in the art.) In view of Equation (6), the constant term, c in Equation (10) represents fiber loss and the Raman gain generated by the forward pumps. Although values for c are, in general, not available, the vector c can be eliminated easily. In particular, let $\rho^{old}$ be the current powers of the backward pumps and let $y(\rho^{old})$ be the corresponding channel powers as measured by an OMON. Then, by considering Equation (10) for both $\rho$ and $\rho^{old}$, and by taking differences, the following relation is obtained:

$$y(\rho) = y(\rho^{old}) + R(\bar{P}(\rho) - \bar{P}(\rho^{old})). \quad (11)$$

By linearizing $\bar{P}(\rho)$ about $\rho^{old}$, we get $$\bar{P}(\rho) - \bar{P}(\rho^{old}) \approx J(\rho - \rho^{old}), \quad (12)$$

where $$J = J(\rho^{old}) := D\,\bar{P}(\rho^{old}) \quad (13)$$

is the Jacobian (fully familiar to those skilled in the art) of the function $$\rho \to \bar{P}(\rho) \quad (14)$$

at the pump settings $\rho^{old}$. Note that, in view of Equations (6) and (8), the entries of the vector $\bar{P}(\rho)$ are simply the integrals of the backward pump powers along the fiber. Specifically, as is well known to those of ordinary skill in the art, for m functions $f_i$ of m variables $x_i$, the Jacobian, written $$\frac{\partial(f_1, f_2, \ldots, f_m)}{\partial(x_1, x_2, \ldots, x_m)}$$

is the following matrix:

$$\begin{bmatrix} \frac{\partial f_1}{\partial x_1} & \frac{\partial f_1}{\partial x_2} & \cdots & \frac{\partial f_1}{\partial x_m} \\ \frac{\partial f_2}{\partial x_1} & \frac{\partial f_2}{\partial x_2} & \cdots & \frac{\partial f_2}{\partial x_m} \\ \vdots & \vdots & \ddots & \vdots \\ \frac{\partial f_m}{\partial x_1} & \frac{\partial f_m}{\partial x_2} & \cdots & \frac{\partial f_m}{\partial x_m} \end{bmatrix}.$$

Finally, by inserting the approximation of Equation (12) into Equation (11), we obtain the linear relation:

$$y(\rho) = y(\rho^{old}) + RJ(\rho - \rho^{old}) \quad (15)$$

between the initial values $\rho$ of the backward pump powers (e.g., in mW) and the corresponding signal powers $y(\rho)$ (e.g., in dBm) at the end of the fiber. Thus, Equation (15) may be advantageously employed as the basis of a Raman control algorithm in accordance with an illustrative embodiment of the present invention.

Note, however, that equation (15) still involves the Jacobian matrix J, as shown in Equation (13), of the mapping shown in Equation (14). As such, and in accordance with an illustrative embodiment of the present invention, we make use of a simple approximation of this backward pump Jacobian, as shown herein. (Note that in accordance with other illustrative embodiments of the present invention, more accurate approximations, which will be obvious to those of ordinary skill in the art, may be employed instead.

Note that the propagation of the backward pump waves along the fiber is described by a set of first-order differential equations similar to those shown in Equation (1). Specifically, these equations are as follows:

$$\frac{d}{dz}P_j^{(b)}(z) = \alpha_j^{(b)} P_j^{(b)}(z) - \sum_{k=1}^{m} \text{sign}(\omega_k^{(b)} - \omega_j^{(b)}) r_{jk}^{(b)} P_k^{(b)}(z) P_j^{(b)}(z) - \quad (16)$$

$$\sum_{l=1}^{m^{(f)}} r_{jl}^{(f)} \text{sign}(\omega_l^{(f)} - \omega_j^{(b)}) P_l^{(f)}(z) P_j^{(b)}(z) +$$

$$\sum_{i=1}^{n} r_{ij}^{(b)} S_i(z) P_j^{(b)}(z),$$

$$0 \leq z \leq L, \quad j = 1, 2, \ldots, m.$$

Here, $\alpha_j^{(b)}$ denotes the fiber loss at backward pump wavelength $\omega_j^{(b)}$.

To obtain a simple approximation of the backward pump Jacobian, advantageously take only the first term of the right-hand side of Equation (16) into account. Thus, by dropping all other terms in Equation (16) and after dividing by $P_j^{(b)}(z)$, we get the approximation $$\frac{d}{dz}\ln P_j^{(b)}(z) \approx \alpha_j^{(b)}. \quad (17)$$

Integrating Equation (17) from z to L gives $$\ln P_j^{(b)}(L) - \ln P_j^{(b)}(z) \approx \alpha_j^{(b)}(L-z), \quad 0 \leq z \leq L. \quad (18)$$

Next, rewrite Equation (18) as follows:

$$P_j^{(b)}(z) \approx (P_j^{(b)}(L)) \exp(\alpha_j^{(b)}(z-L)) = \rho_j \exp(\alpha_j^{(b)}(z-L)), \quad 0 \leq z \leq L. \quad (19)$$

Finally, by integrating Equation (19) from z to L, we obtain $$\bar{P}_j = \int_0^L P_j^{(b)}(z)dz \approx \rho_j \int_0^L \exp(\alpha_i^{(b)}(z-L))dz \qquad (20)$$
$$= \frac{1-\exp(-\alpha_j^{(b)}L)}{\alpha_j^{(b)}} \rho_j$$

for all j=1, 2, ..., m. The approximate relation of Equation (20) suggests the following approximation:

$$D\bar{P}(\rho) \approx J_d := (1-\exp(-\bar{\alpha})) \begin{bmatrix} 1/\alpha_1^{(b)} & 0 & \cdots & 0 \\ 0 & 1/\alpha_2^{(b)} & \ddots & \vdots \\ \vdots & \ddots & \ddots & 0 \\ 0 & \cdots & 0 & 1/\alpha_m^{(b)} \end{bmatrix} \qquad (21)$$

for the Jacobian of the function shown in Equation (14). Here, note that $$\bar{\alpha} \approx \alpha_j^{(b)} L, \; j=1, 2, \ldots, m,$$

is a nominal value for the netloss along the fiber. Note also that $J_d$ is a constant diagonal matrix that does not depend on $\rho$.

The following provides a precise mathematical formulation of the Raman control problem which may be advantageously employed in accordance with an illustrative embodiment of the present invention.

Let $\rho^{old}$ be the current powers (e.g., in mW) of the m backward pumps, and let $y^{old} := y(\rho^{old})$ be the corresponding powers (e.g., in dBm) of the n signal channels, as illustratively measured by an OMON. Note that $\rho^{old}$ and $y^{old}$ are vectors of length m and n, respectively. Let $y^{target}$ be a given vector (of length n) of target powers (e.g., in dBm) for the n channels. Note that the entries of $y^{target}$ may, in general, be arbitrary per-channel target powers, and thus $y^{target}$ is not restricted to constant or tilted target powers.

Then, mathematically, the Raman control problem in accordance with one illustrative embodiment of the present invention is to compute new pump settings $\rho$ such that the corresponding channel powers $y(\rho)$ have minimal peak-to-peak ripple (relative to the target $y^{target}$), and are at the same time close enough to the target $y^{target}$. In accordance with an illustrative embodiment of the present invention, the computation of such new pump settings is advantageously based on the linear relation of Equation (15) between $\rho$ and $y(\rho)$. Moreover, the simple diagonal approximation of $J_d$ as shown in Equation (21) may be advantageously used in Equation (15). Thus, the relation of Equation (15) becomes $$y(\rho)=y^{old}+M(\rho-\rho^{old}), \text{ where } M=RJ_d. \qquad (22)$$

Recall from Equations (6) and (9) that $R=[R_{ij}]$ is the n×m Raman gain matrix whose entries $R_{ij}$ are nominal values for the Raman gain provided for channel i by pump j. Moreover, by Equation (21), the matrix $J_d$ only involves nominal values of the fiber netloss and of the fiber loss at the pump wavelengths.

Next, we formally define mathematically what is meant by ripple (relative to the target) and distance to target. Let y and $y^{target}$ be the channel powers and their target values, respectively, for n channels. If n>1, set $$\text{ripple}(y-y^{target}) := \max_{i=1,2,\ldots,n}(y_i - y_i^{target}) - \min_{i=1,2,\ldots,n}(y_i - y_i^{target}), \text{ and}$$

$$\text{dist\_to\_target}(y-y^{target}) := \frac{1}{2}\left(\max_{i=1,2,\ldots,n}(y_i - y_i^{target}) + \min_{i=1,2,\ldots,n}(y_i - y_i^{target})\right).$$

For a single channel, i.e., n=1, set $$\text{ripple}(y-y^{target}) := 2|y-y^{target}|, \text{ and}$$

$$\text{dist\_to\_target}(y-y^{target}) := |y-y^{target}|.$$

With this notation, and in accordance with the principles of the present invention, the problem of determining new pump settings $\rho$ can be advantageously stated as the following optimization problem:

minimize $\text{ripple}(y(\rho)-y^{target})$ over all $\rho \in R^m$ with $y(\rho)=y^{old}+M(\rho-\rho^{old})$, (23)

$\Delta^{min} \leq \text{dist\_to\_target}(y(\rho)-y^{target}) \leq \Delta^{max}$, $\rho^{min} \leq \rho \leq \rho^{max}$.

Here, $\rho^{min}$ and $\rho^{max}$ are vectors of minimal and maximal possible pump powers. Typically, $$\rho^{min} = \frac{1}{3}\rho^{max}.$$

Moreover, $\Delta^{min}$ and $\Delta^{Max}$ are parameters that can be set to advantageously allow some float from the target. In accordance with one illustrative embodiment of the present invention, default settings of $\Delta^{min}=-0.25$ dB and $\Delta^{max}=0.25$ dB may be advantageously used. In accordance with another illustrative embodiment of the present invention, no float from the target may be desired, in which case $\Delta^{min}$ and $\Delta^{max}$ may both be set to 0 dB. Also, in the case of a single channel (i.e., n=1), it is advantageous to set both $\Delta^{min}$ and $\Delta^{max}$ to ( ) dB.

Note that the optimization problem of Equation (23) is linear in the variables $\rho$. In accordance with the principles of the present invention, this fact allows Equation (23) to be advantageously rewritten as a linear programming problem. Linear programming problems are well understood, and solving such a problems is computationally straightforward. In particular, standard algorithms, such as, for example, the well known simplex method, may be advantageously used to solve such problems.

In accordance with one illustrative embodiment of the present invention, a modified version of the optimization problem shown in Equation (23) may be advantageously solved, as follows. In particular, first, instead of $\rho$, we advantageously use the transformed variable $$d=\rho^{old}-\rho. \qquad (24)$$

The variable d will be referred to herein as the suggested pump change. Once we commit to that change, we obtain the new pump settings as $\rho=\rho^{old}-d$.

Second, in order to make the illustrative technique insensitive to possible OMON noise, we advantageously minimize the sum of the ripple and a small multiple of the maximal component of the pump change d, rather than simply minimizing the ripple as shown in Equation (23). That is, the objective function in Equation (23) is advantageously replaced by $$\text{ripple}(y - y^{target}) + \beta \max_{j=1,2,\ldots,m} |d_j|. \tag{25}$$

In accordance with this illustrative embodiment of the present invention, $\beta \geq 0$ is a regularization parameter that may be set by the user. In the absence of OMON noise, the user may advantageously set $\beta=0$. A typical value for OMON noise is approximately 0.2 dB, and thus, in accordance with the illustrative embodiment of the present invention, the regularization parameter $\beta=0.01$ is advantageously used.

Third, note that in certain multispan DWDM optical systems, the pump adjustments at each of the nodes connecting the spans may be done independently. Thus, in general, changes in the OMON readings at a given node may be the result of pump adjustments at that node or at upstream nodes. As such, in accordance with an illustrative embodiment of the present invention, a suitable variant of a "trust-region" strategy is employed. This strategy advantageously allows inferring from the OMON readings at a given node whether changes of signal powers are due to the most recent pump adjustments at that node or due to upstream nodes adjusting their pumps. The use of a trust-region strategy in accordance with the illustrative embodiment of the present invention adds the following upper and lower bounds (the trust-region bounds), $$-\delta \leq d_j \leq \delta, j=1,2,\ldots,m. \tag{26}$$

on the size of the pump change d to the constraints of the optimization problem of Equation (23). The number $\delta$ in Equation (26) will be referred to herein as the trust-region "radius," and is advantageously adapted dynamically in accordance with the illustrative embodiment of the present invention. Note that the trust-region radius always satisfies $$0 < \delta^{min} \leq \delta \leq \delta^{max},$$

where $\delta^{min}$ and $\delta^{max}$ are given constants that advantageously limit the range of $\delta$. The primary advantage of using the trust-region strategy is that the actual ripple of the signal powers from the OMON reading is compared with the ripple predicted by the model of Equation (22) (applied to the most recent pump adjustments). If the actual and the predicted ripple differ significantly, one may conclude that upstream nodes are also adjusting their pumps. Thus, in such a case, a may be advantageously replaced by the reduced value $$\delta := \max\{\mu\delta, \delta^{min}\},$$

where $0 < \mu < 1$ is a fixed reduction factor, thus advantageously allowing only smaller pump movements. On the other hand, if there is very good agreement between the actual and the predicted ripple, then it is highly unlikely that any upstream nodes are also adjusting their pumps, and in this case, $\delta$ may be advantageously replaced by the increased value $$\delta := \min\{\nu\delta, \delta^{max}\},$$

where $\nu > 1$ is a fixed factor, such as, for example, $\nu=1/\mu$. Finally, if the actual and the predicted ripple neither differ significantly, nor agree very well, the trust-region radius $\delta$ is advantageously left unchanged. (Trust-region techniques are conventional and well known to those of ordinary skill in the art.) Illustratively, $\delta^{min}=2$ mW (milliwatts), $\delta^{max}=15$ mW, and, initially, $\delta=15$ mW.

An Optimization Problem to be Solved According to One Illustrative Embodiment

In accordance with an illustrative embodiment of the present invention, the optimization problem shown in Equation (23), with the modifications described above, may be advantageously rewritten as a linear program. In particular, note that the objective function shown in Equation (23) is advantageously replaced by Equation (25).

First, recall from Equation (24) that in accordance with an illustrative embodiment of the present invention, the variable d, rather than the variable $\rho$, is used. With use of Equation (24), the model shown in Equation (22) becomes $$y=y(d)=y^{old}-Md.$$

To express $\text{ripple}(y(d)-y^{target})$ and $\text{dist\_to\_target}(y(d)-y^{target})$ in terms of linear variables, the additional unknowns $\sigma_1$ and $\sigma_2$ are advantageously introduced, such that they satisfy the following constraints:

$$\sigma_1 e^{(n)} \geq y^{old}-Md-y^{target}, \tag{27}$$

$$\sigma_2 e^{(n)} \leq y^{old}-Md-y^{target}. \tag{28}$$

Here, and in the following, $e^{(k)}$ denotes the vector of all ones:

$$e^{(k)} = \begin{bmatrix} 1 \\ 1 \\ 1 \\ \vdots \\ 1 \end{bmatrix} \in \mathbb{R}^k.$$

Furthermore, a third additional unknown, $\sigma_3$, is advantageously introduced, such that it satisfies the following constraints:

$$\sigma_3 e^{(m)} \geq d \geq -\sigma_3 e^{(m)}. \tag{29}$$

Note that the inequalities of Equations (27), (28) and (29) imply that the objective function of Equation (25) is bounded as follows:

$$\text{ripple}(y - y^{target}) + \beta \max_{j=1,2,\ldots,m} |d_j| \leq \sigma_1 - \sigma_2 + \beta\sigma_3. \tag{30}$$

Then, replace the objective function in Equation (23) by the right-hand side of Equation (30), and add the constraints of Equations (27), (28) and (29), as well as the trust-region bounds of Equation (26), to the original problem shown in Equation (23). The resulting new "version" of Equation (23) then becomes the following linear program, which will be referred to herein as "(LP)":

$$\text{minimize } \sigma_1 - \sigma_2 + \beta\sigma_3$$

$$\text{over all } \sigma_1, \sigma_2, \sigma_3 \in \mathbb{R}, d \in \mathbb{R}^m \text{ with}$$

$$-\sigma_1 e^{(n)} - Md \leq y^{target} - y^{old},$$

$$\sigma_2 e^{(n)} + Md \leq y^{old} - y^{target},$$

$$-\sigma_3 e^{(m)} \leq d \leq \sigma_3 e^{(m)},$$

$$\Delta^{min} \leq \frac{1}{2}(\sigma_1 + \sigma_2) \leq \Delta^{max}$$

$$\rho^{old} - \rho^{max} \leq d \leq \rho^{old} - \rho^{min},$$

$$-\delta e^{(m)} \leq d \leq \delta e^{(m)}.$$

Note that the objective function and all the constraints of (LP) are linear functions of the unknowns $\sigma_1, \sigma_2, \sigma_3$, and d, and thus (LP) is indeed a linear program. The vector d of the solution to the linear program (LP) is advantageously the suggested pump change.

Note also that the objective function of (LP) is merely the right-hand side of Equation (30). By minimizing the right-hand side of Equation (3) over all $\sigma_1$, $\sigma_2$, $\sigma_3$ that satisfy the constraints of Equations (27), (28) and (29), one can ensure that the original problem of Equation (23) and the linear program (LP) are indeed equivalent.

Figure 5:
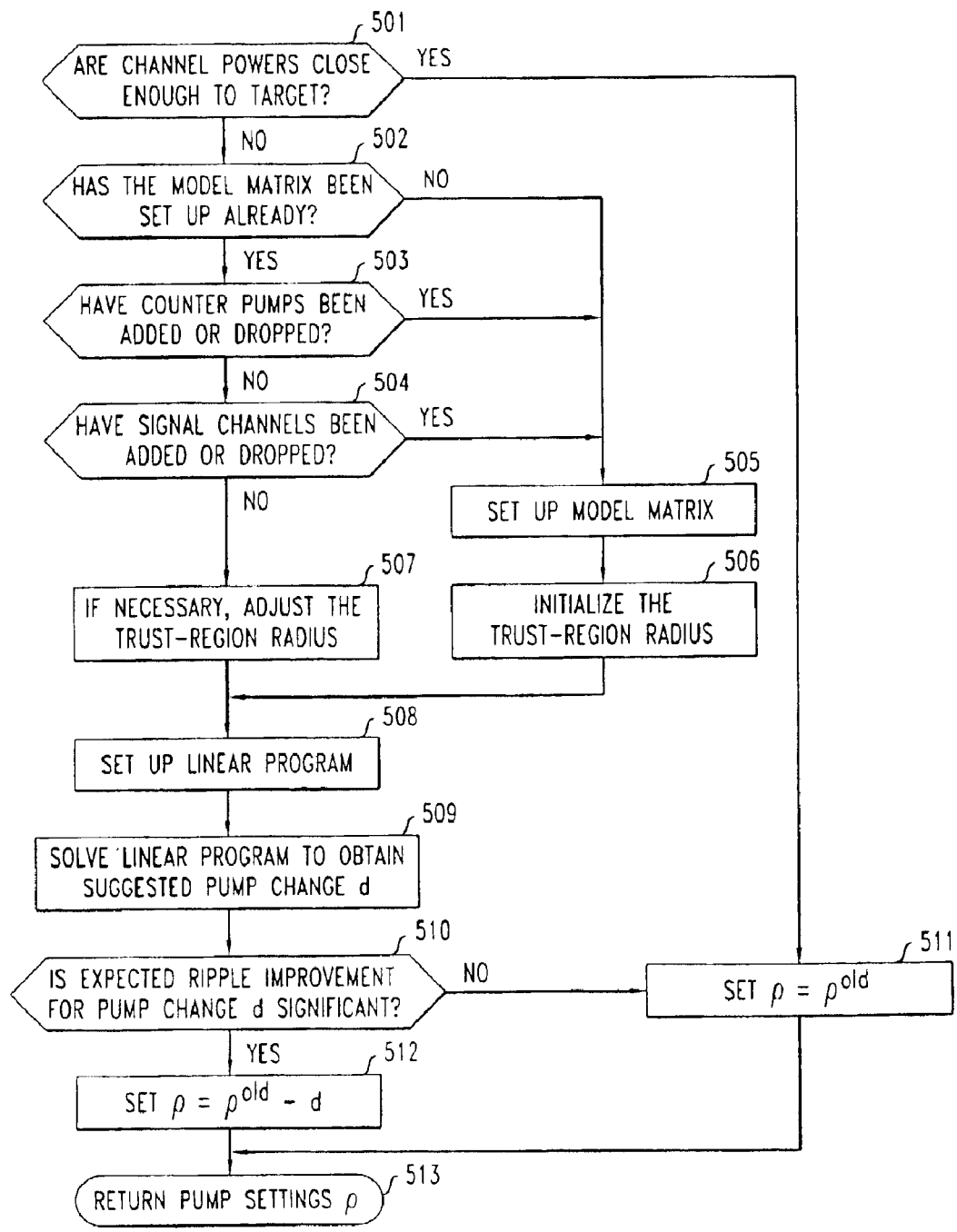
FIG. 5 shows a flowchart detailing the operation of a method for controlling the pump powers of a Raman-pumped DWDM optical system in accordance with an illustrative embodiment of the present invention.

A Method for Controlling the Pump Powers of a Raman-Pumped DWDM System According to an Illustrative Embodiment of the Present Invention In accordance with an illustrative embodiment of the present invention, a Raman pump control algorithm is advantageously implemented as an iterative procedure which, at each iteration, computes a suggested pump change d by solving a linear program (LP), and then returns a new pump setting. FIG. 5 shows a flowchart detailing the operation of such a method for controlling the pump powers of a Raman-pumped DWDM optical system in accordance with an illustrative embodiment of the present invention.

The input to the illustrative algorithm comprises:

(i) The old pump settings $\rho^{old}$(in mW);

(ii) The corresponding channel powers $y^{old}$(in dBm); and (iii) The target values $y^{target}$(in dBm) for the channel powers.

The output from the illustrative algorithm comprises:

The new pump settings $\rho$ (in mW).

As shown in the flowchart of FIG. 5, the steps of the illustrative algorithm are:

Step 1 (see decision box 501 and block 511): If both ripple($y^{old}-y^{target}$) and dist_to_target ($y^{old}-y^{target}$) are small enough—illustratively, less than 0.02 dB—then set $\rho=\rho^{old}$ and go to Step 11.

Step 2 (see decision box 502): If no model matrix M has been set up yet, continue with Step 5.

Step 3 (see decision boxes 503 and 504): If channels or pumps have been added or dropped, then continue with Step 5.

Step 4 (see block 507): Compare ripple($y^{old}-y^{target}$) with the predicted ripples in accordance with conventional trust-region techniques (which will be fully familiar to those skilled in the art), and, based on the comparison results, update the trust-region radius$\delta$ if appropriate. As is well known to those of ordinary skill in the art familiar with trust-region techniques, it is advantageous to compute a ratio in which the ripple of the "previous" $y^{old}$ is subtracted from ripple($y^{old}-y^{target}$) to form the numerator, and wherein the ripple of the "previous" $y^{old}$ is subtracted from the predicted ripple to form the denominator. The resulting ratio is then examined to determine whether to update the trust-region radius$\delta$. For example, if the ratio is illustratively less than 0.5, then $\delta$ may be advantageously replaced by the reduced value $\delta:=\max\{\mu\delta,\delta^{min}\}$, whereas if the ratio is illustratively greater than 0.6, then $\delta$ may be advantageously replaced by the increased value $\delta:=\min\{v\delta,\delta^{max}\}$. After updating the trust-region radius$\delta$ (if appropriate), continue with Step 7.

Step 5 (see block 505): Set up new model matrix $M=RJ_d$, where R is as defined in Equation (9) above and $J_d$ is as defined in Equation (21) above.

Step 6 (see block 506): Set the trust-region bounds $\delta^{min}$ and $\delta^{max}$, illustratively to 2 mW and 15 mW, respectively, and initialize the trust-region radius$\delta$, illustratively to $\delta^{max}$.

Step 7 (see block 508): Set up the linear program, as shown above as (LP).

Step 8 (see block 509): Solve the linear program (LP) to obtain the suggested pump change d. Note that any one of a number of conventional techniques for solving a linear program, such as, for example, the well-known simplex method, may be used.

Step 9 (see decision box 510 and block 511): Check if the expected ripple improvement for suggested new pump settings $\rho^{old}$–d is significant enough (illustratively, at least 0.02 dB) to commit to the new pump settings. If not, set $\rho=\rho^{old}$ and go to Step 11.

Step 10 (see block 512): Set $\rho=\rho^{old}$–d.

Step 11 (see block 513): Return the pump settings $\rho$.

Addendum to the Detailed Description

It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

I claim:

1. A method for determining one or more Raman pump powers for use in an optical transmission system employing Raman amplification, the method comprising the steps of:

formulating a linear programming optimization problem and generating data representative thereof, wherein the linear programming optimization problem is directed to determining one or more new pump power setting values based at least on one or more previous pump power setting values; and solving the linear programming optimization problem with use of the generated data to thereby determine the one or more new pump power setting values for subsequent use in setting said one or more Raman pump powers.

2. The method of claim 1 wherein the linear programming optimization problem is directed to determining the one or more new pump power setting values further based on one or more channel power values corresponding to the one or more previous pump power setting values, and one or more channel power target values corresponding to the one or more channel power values.

3. The method of claim 2 wherein the linear programming optimization problem is directed to determining the one or more new pump power setting values which substantially minimize a peak-to-peak ripple of the one or more channel power values with respect to the one or more channel power target values.

4. The method of claim 2 wherein the linear programming optimization problem is directed to determining one or more pump power change values representing differences between the one or more new pump power setting values and the one or more previous pump power setting values.

5. The method of claim 4 wherein the linear programming optimization problem is directed to determining the one or more pump power change values which substantially minimize a sum of:

(i) a peak-to-peak ripple of the one or more channel power values with respect to the one or more channel power target values, and (ii) a function of said one or more pump power change values.

6. The method of claim 5 wherein said function of said one or more pump power change values comprises a maximum of said one or more pump power change values multiplied by a regularization parameter.

7. The method of claim 4 wherein the one or more channel power values have been determined with use of one or more optical channel monitors.

8. The method of claim 7 further comprising the step of comparing the one or more channel power values to one or more corresponding predicted channel power values, and wherein the one or more pump power change values are bounded by a trust-region radius having a value based on a difference between said one or more channel power values and said one or more corresponding predicted channel power values.

9. The method of claim 1 wherein the step of solving the linear programming optimization problem with use of the generated data comprises applying a simplex method-based technique for solving linear programming optimization problems to the generated data.

10. The method of claim 1 wherein the optical transmission system uses a wavelength-division-multiplexing technique.

11. An apparatus for determining one or more Raman pump powers for use in an optical transmission system employing Raman amplification, the apparatus comprising a processor; and a memory, wherein the memory comprises computer executable code which when executed will formulate a linear programming optimization problem and will generate data representative thereof, wherein the linear programming optimization problem is directed to determining one or more new pump power setting values based at least on one or more previous pump power setting values, the memory further comprising computer executable code which when executed will solve the linear programming optimization problem with use of the generated data to thereby determine the one or more new pump power setting values for subsequent use in setting said one or more Raman pump powers.

12. The apparatus of claim 11 wherein the linear programming optimization problem is directed to determining the one or more new pump power setting values further based on one or more channel power values corresponding to the one or more previous pump power setting values, and one or more channel power target values corresponding to the one or more channel power values.

13. The apparatus of claim 12 wherein the linear programming optimization problem is directed to determining the one or more new pump power setting values which substantially minimize a peak-to-peak ripple of the one or more channel power values with respect to the one or more channel power target values.

14. The apparatus of claim 12 wherein the linear programming optimization problem is directed to determining one or more pump power change values representing differences between the one or more new pump power setting values and the one or more previous pump power setting values.

15. The apparatus of claim 14 wherein the linear programming optimization problem is directed to determining the one or more pump power change values which substantially minimize a sum of:

(i) a peak-to-peak ripple of the one or more channel power values with respect to the one or more channel power target values, and (ii) a function of said one or more pump power change values.

16. The apparatus of claim 15 wherein said function of said one or more pump power change values comprises a maximum of said one or more pump power change values multiplied by a regularization parameter.

17. The apparatus of claim 14 wherein the one or more channel power values have been determined with use of one or more optical channel monitors.

18. The apparatus of claim 17 wherein the memory further comprises computer executable code which when executed will compare the one or more channel power values to one or more corresponding predicted channel power values, and wherein the one or more pump power change values are bounded by a trust-region radius having a value based on a difference between said one or more channel power values and said one or more corresponding predicted channel power values.

19. The apparatus of claim 11 wherein solving the linear programming optimization problem with use of the generated data comprises applying a simplex method-based technique for solving linear programming optimization problems to the generated data.

20. The apparatus of claim 11 wherein the optical transmission system uses a wavelength-division-multiplexing technique.

* * * * *